United States Patent [19]

Hirano et al.

[11] 3,912,542

[45] Oct. 14, 1975

[54] METHOD OF PRODUCING LAMINATED SHEET-LIKE MATERIAL

[75] Inventors: Jiro Hirano, Kobe; Toshio Yamada, Nishinomiya, both of Japan

[73] Assignee: Nippon Sheet Glass Co., Ltd., Osaka, Japan

[22] Filed: June 29, 1973

[21] Appl. No.: 374,889

[30] Foreign Application Priority Data
June 30, 1972 Japan.............................. 47-66158
Oct. 17, 1972 Japan............................ 47-104299
Mar. 19, 1973 Japan............................ 48-32110
Mar. 27, 1973 Japan............................ 48-35387

[52] U.S. Cl. ............... 156/104; 156/106; 156/286; 156/312
[51] Int. Cl.². B32B 5/16; B32B 17/10; B32B 31/20
[58] Field of Search ............ 156/99, 104, 276, 286, 156/106, 312; 161/197, 199, 203, 204; 219/203

[56] References Cited
UNITED STATES PATENTS

| | | | |
|---|---|---|---|
| 3,234,062 | 2/1966 | Morris | 156/104 |
| 3,249,479 | 5/1966 | Boicey | 156/104 |
| 3,281,296 | 10/1966 | Jameson | 156/106 |
| 3,344,014 | 9/1967 | Rees | 156/106 |
| 3,359,352 | 12/1967 | Powell et al. | 264/126 |
| 3,409,759 | 11/1968 | Boicey et al. | 219/203 |
| 3,484,584 | 12/1969 | Shaw | 219/203 |
| 3,532,590 | 10/1970 | Priddle | 156/104 |
| 3,555,136 | 1/1971 | Rouoult | 264/122 |
| 3,769,133 | 10/1973 | Halberschmidt et al. | 156/104 |

Primary Examiner—Daniel J. Fritsch
Attorney, Agent, or Firm—Wenderoth, Lind & Ponack

[57] ABSTRACT

A method of producing a laminated sheet-like material, which comprises interposing an adhesive powdery thermoplastic resin composition or an air-permeable sintered product thereof between at least two sheet-like materials to form an assembly, maintaining the assembly at reduced pressure to deaerate the adhesive layer, and heating the assembly while maintaining it at reduced pressure at least at the intial stage of heating thereby to melt the powdery thermoplastic resin composition or the sintered product and bond the sheet-like materials to provide an integral body.

13 Claims, 8 Drawing Figures

METHOD OF PRODUCING LAMINATED SHEET-LIKE MATERIAL

This invention relates to a method for bonding sheet-like materials, and more specifically to a method for bonding sheet-like materials, especially glass sheets, in vacuo using a powdery thermoplastic resin composition as a bonding agent.

A glass laminate produced by bonding two sheets of glass by an interlayer of a synthetic resin has the advantage that even when it breaks, the fragments of the glass do not scatter about. Such a laminated glass has been widely used as windowpanes of various vehicles or as construction materials. Generally, the following three methods have been known to produce such a glass laminate. The first of these methods comprises interposing a film of plasticized polyvinyl butyral (to be abbreviated simply as butyral film) between two glass sheets, heating them gradually to 60° to 80°C., passing the assembly through squeeze rollers to remove most of the air present between the glass sheets and to bond the glass sheets provisionally, and then heating the bonded assembly at 120° to 150°C. at a pressure of 10 to 15 Kg/cm$^2$ in an autoclave filled with an oil or air thereby to soften and fluidize the butyral film and to cause it to adhere intimately to the glass sheets, thus giving a transparent glass laminate. The second method involves placing two glass sheets face to face with a spacer therebetween to form a cell, pouring a liquid resin into the cell, and curing the resin to form a glass laminate. Another method comprises applying a liquid resin to such a material as a film, cloth or paper by impregnation or coating, interposing the material between glass sheets to form an assembly, and then heating it to cure the liquid resin.

However, according to the first method, the manufacture of butyral films require enormous costs of equipment and a high level of technique, and therefore, the glass laminate manufacturers cannot possess their own equipment for producing the butyral films. Furthermore, the resulting butyral films should be wound up after spraying sodium bicarbonate or the like in order to prevent blocking. Accordingly, prior to use, it is necessary to wash out the sodium bicarbonate and then dry the film again. In order to obtain complete bonding, both the prebonding step and the bonding step are required. Furthermore, it is necessary to remove the air present in the inside of the assembly consisting of the butyral film and the glass sheets as much as possible to reduce the possibility of bubbles remaining in the product. In order to prevent the oil or air as a pressure medium from intruding between the glass sheets and the butyral film at the time of treatment in an autoclave, the pre-bonding should be carefully performed, and prior to charging into the autoclave, the assembly should be carefully sealed. Furthermore, the assembly should be heated under pressure in the autoclave. In the bonding step using the autoclave, pressures as high as 10 to 15 Kg/cm$^2$ should be applied, and heating should be performed uniformly in the meantime. Thus, the manufacturing equipment becomes complicated and costly. In addition, the heat capacity of the equipment becomes extremely high, and therefore, long periods of time are required for an indirect step of elevating and lowering the temperature at the time of heating. Moreover, the loss of energy is enormous. This of course leads to an increase in the cost of production. The product obtained has the defect that when it is exposed to high temperatures in use, the butyral film is likely to bubble, because the air remaining in the pre-bonded product is forcibly absorbed by the butyral film by the high pressure treatment in the autoclave.

According to the second method, the spacer portion still remains around the laminate produced, and when it is desired to produce a large-sized laminate, it is difficult to maintain two sheets parallel to each other. Furthermore, no resin which meet the requirements of the interlayer of a laminate, such as adhesiveness, stretchability or transparency, to a satisfactory degree have ever been found.

In the last-mentioned method, the liquid resin is restricted in its particle size to substantially low values for aiding in the coating and defoaming operations, and thus, the types and physical properties of the resins that can be used are limited. It is also extremely difficult to prescribe the thickness of the bonding layer as desired. This tendency becomes more pronounced when it is desired to produce a laminate of a large area. Accordingly, the laminate obtained by using a liquid resin bonding agent is less safe than those produced by using the butyral film because of the lack of some of the desirable properties of the resin or the lack of its thickness.

It is therefore an object of this invention to provide a method of laminating sheet-like materials, especially glass sheets, which have eliminated the above described defects of the conventional laminated sheet making techniques.

Other objects of this invention along with its advantages will become apparent from the following description.

According to this invention, there is provided a method for producing a laminated sheet-like material, which comprises interposing an adhesive powdery thermoplastic resin composition or an air-permeable sintered product thereof between at least two sheet-like materials to form an assembly, maintaining the assembly at reduced pressure to deaerate the adhesive layer, and heating the assembly while maintaining it at reduced pressure at least at the initial stage of heating thereby to melt the powdery thermoplastic resin composition or the sintered product and bond the sheet-like materials to provide an integral body.

The method of this invention can be applied to the laminating of a plurality of sheet-like materials which have equal or same coefficient of thermal expansion and are non-porous or porous to an extent such that the pores do not permit the exuding of the molten resin. It is especially advantageously applied to glass sheets, asbestos cement plates, plaster boards and synthetic resin plates. Most advantageously, the invention can be applied to the laminating of glass sheets. The method is also applicable to the laminating of at least two different kinds of sheet-like material, for example, the laminating of glass sheets and plaster boards.

The most critical feature of the present invention is that a thermoplastic resin composition in powdery form is used instead of a conventional film- or sheet-like resin such as the butyral film or the liquid resin.

The powdery thermoplastic resin composition used in the present invention melts by heating and exhibits bonding force upon solidification by cooling, and is the so-called "hot-melt type" resin adhesive. Typical examples of the resin are (a) vinyl resins such as an ethylene/vinyl acetate copolymer, vinyl acetate resins (e.g., polyvinyl acetate or vinyl acetate derivatives), or polyvinyl butyral resins, (b) acrylic resins such as a butyl methacrylic resin, and (c) other types of resin such as a polyamide resin or polyisobutylene. Of these resins, the ethylene/vinyl acetate copolymer, the polyvinyl butyral resin and the polyamide resin are especially suitable for glass laminate.

These resins are all used in the powdery form, but if desired in order to improve the softness, adhesiveness and weatherability of the adhesive layer, or the ease of laminating operation, etc., they may contain a plasticizer, a melt viscosity regulator, an anti-decomposition agent, an anti-blocking agent, a polymer for adjusting the softening temperature of the resin, or an ultraviolet absorbent. For example, the polyvinyl butyral resin is used often after being plasticized with a plasticizer such as triethylene glycol diethyl butyrate, triethylene glycol diethyl hexoate or dibutyl sebacate.

When it is desired to obtain a laminated sheet-like material having a colored adhesive layer, the resin powder may contain a dye or pigment.

The powdery resin compositin that can be used for carrying out the method of this invention should have a particle diameter such that when an assembly consisting of sheet-like materials and an adhesive layer of the resin compositin is maintained at reduced pressure, spaces sufficient for deaerating the adhesive layer are present among the individual particles of the resin composition. The particle diameter can vary widely according to various factors such as the distance between sheets to be bonded, the method of deaeration at reduced pressure, the degree of pressure reduction, the heating conditions, or the type of the resin. Usually, however, the resin may have an average particle diameter smaller than 28 mesh (Tyler, diameter about 500 microns) in order to form an adhesive layer having uniform thickness. Since very finely dividied particles render the air-permeability of the adhesive layer poor, it is convenient generally to use a powdery resin composition having an average particle diameter of 325 mesh (44 microns) to 14 mesh (1168 microns). Preferably 28 mesh (589 microns) to 200 mesh (74 microns).

The resin composition powder can be directly applied to the surfaces of sheet-like materials to be bonded. For example, the resin powder is sprayed all over the surface of a sheet-like material, and a layer of the powder is uniformly spread by a suitable leveling means such as a doctor knife to form an adhesive layer, after which the sheet-like material is superposed on another sheet-like material. At this time, it is preferred that the layer of the resin composition should have a bulk density of 0.2 to 0.4, preferably 0.3 to 0.35 so that there is sufficient flow path for the air at the time of deaeration at reduced pressure. In order to prevent the scattering or drop off of the resin particles during handling after they have been applied to sheet-like materials, the peripheral portion, the surface layer or the entirety of the resin powder layer may be sintered prior to laminating by heating to an extent such that a flow path for the air at the time of deaeration at reduced pressure can be provided. This converts the layer into an air-permeable sintered body.

In another aspect of this invention, the powdery resin composition may be formed into an air-permeable sintered sheet prior to the laminating operation, and then interposed between sheet-like materials. This air-permeable sintered sheet can be formed into the desired thickness and width, and is especially convenient for use in the method of this invention since it is not necessary to handle powders in the laminating operation.

The air-permeable sintered sheet which is used in this preferred embodiment of this invention can be produced, for example, by spraying the powder of a thermoplastic resin composition uniformly on a smooth plate, spreading the powdery resin composition to the desired thickness by a leveling means such as by using a doctor knife, and heating it by an irradiating means such as an infrared heater, or heating it in a heating oven. A continuous ribbon-like air-permeable sintered sheet can also be produced by a method comprising uniformly spraying the powder of a thermoplastic resin composition on a rotating drum having a smooth surface or a moving flat endless belt instead of the flat plate, spreading the powder to the desired thickness, and then heating the resulting powder layer. In any case, it is possible to coat the surface of a support for forming the powdery layer or sintering it with a releasing agent such as a tetrafluoroethylene resin which has the ability to prevent blocking, depending upon the type of the thermoplastic resin composition, the method of heating or the degree of heating. The conditions for sintering will be readily understood to those skilled in the art. The sintering temperature should however be not in excess of at least 100°C. above the softening temperature of the resin used. The layer of the air-permeable sintered product formed on the surface of the sheet-like materials or the pre-formed air-permeable sintered sheet can have a wide range of bulk density according to the particle size of the resin composition powder used, or the sintering conditions. However, in order not to give any trouble to the deaeration of the adhesive layer at reduced pressure, it desirably has a bulk density of 0.2 to 0.4, preferably 0.3 to 0.35.

The resulting assembly formed by interposing the powder of the thermoplastic resin composition or its sintered product between a plurality of sheet-like materials is then maintained at reduced pressure to deaerate the adhesive layer. When the adhesive layer has been sufficiently deaerated, the assembly is heated to melt the resin powder or the sintered product to laminate the sheet-like materials into an integral body. At least in the initial stage of heating, the assembly should be maintained at reduced pressure.

In order to maintain the assembly at reduced pressure, the assembly is placed in a chamber maintained air-tight, and the chamber is evacuated gradually. The degree of pressure reduction differs according to such factors as the thickness or porosity (bulk density) of the adhesive layer, but generally it is recommended to reduce the pressure to not more than −650 mmHg gauge (absolute pressure 110 mmHg), preferably not more than −700 mmHg gauge (−0.95 Kg/cm$^2$).

Where the adhesive layer is composed of powders, it is preferably to reduce the pressure gradually so that the powders will not be scattered about at the time of evacuation. Where the adhesive layer is composed of the sintered body, the evacuation may be performed rapidly because there will be no likehood of scattering. This makes it possible to shorten the time required for the pressure reducing operation.

The assembly from which the air has been evacuated by maintaining the adhesive layer at reduced pressure is then transferred to a heating step while still at reduced pressure. Heating can be performed by a conventional method, and in this heating step, the resin composition in the adhesive layer is melted to form a transparent layer.

The heating temperature and time differ according to such factors as the thickness and form of the adhesive layer, or the type or particle size of the thermoplastic resin used. Generally, it is preferred that the thermoplastic resin be heated to a temperature 10° to 50°C. higher than the softening temperature of the thermoplastic resin used. Heating can be performed in a conventional heating oven. Although the heating can be satisfactorily carried out in one stage, it can be carried out, if desired, in two stages, whereby lamination becomes more complete, and a laminated sheet product of better quality can be obtained. The two-stage heating can be carried out, for example, by (a) heating the assembly in the deaerated state to an extent such that the thermoplastic resin composition is softened (first heating), and then (b) releasing the reduced pressure condition and then heating the assembly further in a load-free condition (second heating). At this time, the second heating is preferably carried out at a temperature higher than the first heating. Usually, the second heating temperature is 0° to 30°C. higher than the first heating temperature. If the temperature is elevated at reduced pressure, the resin composition is likely to exude. Accordingly, it is necessary to perform the first heating at a relatively low temperature to maintain the resin highly tacky, and in the second stage where the reduced pressure is released, the assembly is maintained at a higher temperature in order to bond the resin uniformly to the glass and render the thickness of the resin layer uniform.

It is preferred that during the period of heating in the deaerated state at reduced pressure, the assembly be maintained in a state of being pressed from both sides of the laminate. The pressing force may be 0.8 Kg/cm² to 1.0 Kg/cm², preferably 0.95 Kg/cm² to 1.0 Kg/cm². If a special vacuum bag or pressure reduction chamber to be described is used, the pressing force on the assembly can be furnished by the difference in pressure between the degree of reduced pressure of the adhesive layer and atmospheric pressure. This makes it possible to give a uniformly distributed pressing force on the entirety of the assembly.

Thus, in the method of this invention, the outer surface of the laminated assembly is pressed by atmospheric pressure when it is heated to a temperature at which the thermoplastic resin composition powder is softened, and therefore, the powdery resin which forms the adhesive layer becomes completely integral to form a uniform transparent film.

Although the method of this invention is most convenient for bonding two sheets of glass, it is not limited thereto, but is effective for bonding more than two sheet-like materials of the same kind or for bonding sheet-like materials of different kinds.

The pressure reduction and subsequent heating of the assembly produced in accordance with the method of this invention can be more effectively performed by using a vacuum bag or vacuum chamber as shown in the accompanying drawings in which.

Figure 1:
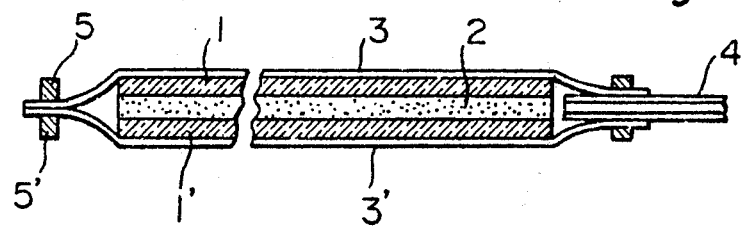
FIG. 1 is cross sectional view of a vacuum bag in which the assembly is packed for pressure reduction.

Most simply, an assembly consisting of sheet-like materials 1 and 1' and an adhesive layer interposed therebetween as shown in FIG. 1 is completely covered by two high tensile thermally stable gas-tight, flexible sheets 3, 3' (for example, a glass cloth lined with a thermally stable material such as a silicone rubber or a tetrafluoroethylene polymer, a polyvinyl alcohol sheet, a polyvinyl fluoride sheet, or a polyvinyl chloride sheet). Then, an exhaust port 4 is provided, and the edges are held by holding frames 5,5' to form a vacuum bag. At room temperature, the vacuum bag is evacuated by means of a vacuum pump (not shown) from the exhaust port 4. When the inside of the bag reaches a predetermined pressure, the vacuum bag is then charged in a heating oven such as a blast oven to heat it.

Figure 2:
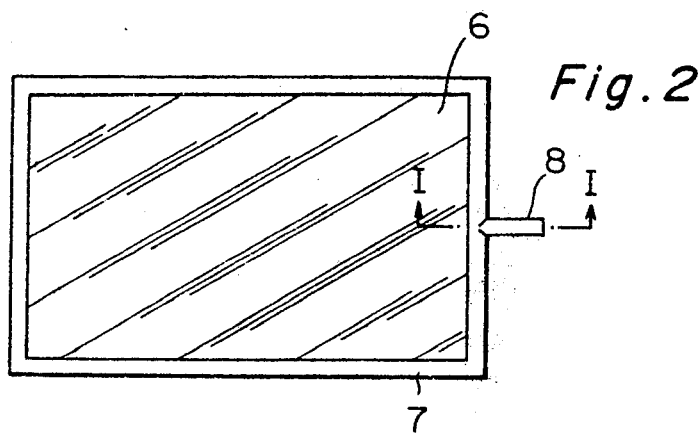
FIG. 2 is a front elevation of the assembly in accordance with the present invention arond which a rubber gasket is mounted.
Figure 3:
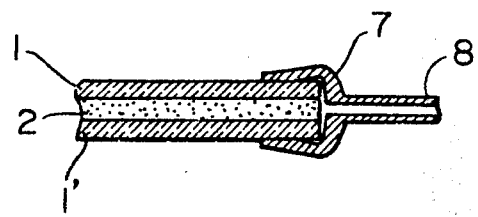
FIG. 3 is a longitudinal section view taken along the line I-I of FIG. 2.

Instead of the vacuum bag, it is possible to use a rubber gasket 7 as shown in FIGS. 2 and 3 having a C-shaped sectional construction. As shown in FIG. 3, the rubber gasket 7 with an exhaust port 8 is fitted on the edge of the laminated assembly 6 to make the adhesive layer 2 of the assembly air-tight. Then, the adhesive layer is evacuated by means of a vacuum pump from the exhaust port 8.

Furthermore, as a modification of the vacuum bag shown in FIG. 1, a pressure reduction chamber consisting of a sheet which is at least partly flexible and gas-tight can also be utilized. The assembly formed by interposing the adhesive layer 2 between the sheet-like materials 1,1' is transferred to a sheet-like rigid body 9 equipped with an exhaust port near its end portion, and covered with a flexible sheet 3. The edges of the sheet 3 are held by a holding frame 10 and clamped by a clip 11 to form a pressure reduction chamber.

Figure 4:
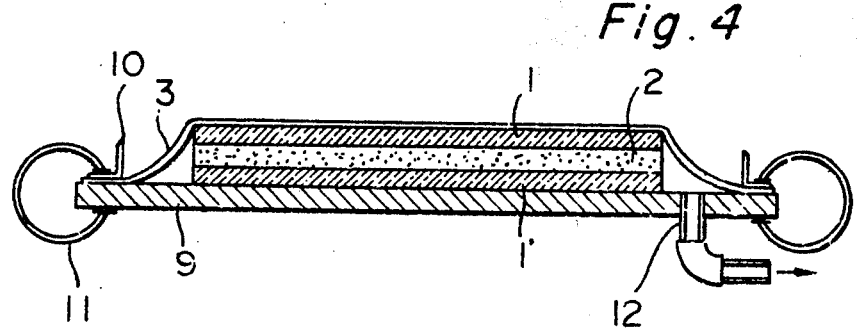
FIG. 4 is a cross-sectional view of a pressure reduced chamber when the assembly in accordance with this invention is placed therein.

When in the above-described apparatus, an assembly consisting of a powdery thermoplastic resin composition or its sintered product and sheet-like materials is sealed in a vacuum bag or pressure reduction chamber as shown in FIGS. 1 and 4 and then the air inside is evacuated from any desired point at the edge of the bag or chamber to place the adhesive layer uniformly under vacuum, the assembly undergoes the action of the atmospheric pressure through the flexible sheet, and the resin portion of the adhesive layer is held by two sheet-like materials. If at this time, a thin material is used as the sheet-like material, the following phenomenon may occur sometimes. When the end portions of the sheet-like materials are different in size or not registered thus forming projected portions, especially when one side of the pressure reduction chamber shown in FIG. 4 is made of a sheet-like rigid material and the assembly is placed thereon at which time the upper sheet-like material projects, the projecting part of the sheet-like material is bended by the atmospheric pressure which acts on the surface of the sheet-like materials. If the sheet-like material is glass, it may be broken.

When the assembly is placed in the vacuum bag or the pressure reduction chamber and heated for bonding in the evacuated state at reduced pressure, the adhesive thermoplastic resin is melted and softened, but since the sheet-like materials are pressed by the action of the atmospheric pressure, the resin in the interlayer partly flows out with a decrease in viscosity at the edge portion of the assembly, and the thickness of the interlayer is reduced. Thus, the thickness of the laminated sheet-like material is reduced at the edge portion, and when a transparent thin glass sheet or synthetic resin sheet is used as the sheet-like material, an image seen through it is sometimes distorted. Furthermore, since at this portion the sheet-like material is bonded by the reduced thickness of the adhesive layer, when the adhesive layer is softened as a result of heating the laminated sheet-like material to high temperatures, the bending of the sheet-like materials is removed and as a result, the separation of the adhesive layer from the sheet-like materials or the inclusion of bubbles may occur. Such difficulties hardly pose a problem if the sheet-like material is not glass.

Figure 5:
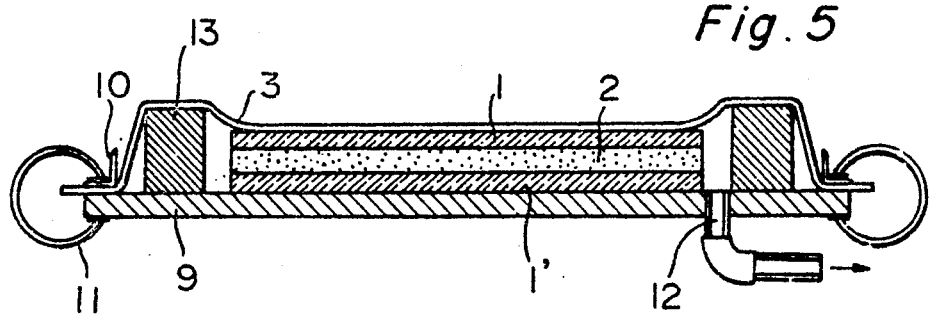
FIG. 5 is a cross-sectional view of a combination of a pressure reduction chamber and the assembly used conveniently in the method of this invention, which has been obtained by incorporating a press buffering frame in the pressure reduction chamber shown in FIG. 4.

These difficulties which are significant in the case of a thin sheet-like material, especially a glass sheet, can be easily avoided by evacuating and heating the pressure reduction chamber while a buffering frame made of a rigid body having a thickness somewhat larger than the total thickness of the assembly is provided along the edge of the assembly as shown in FIG. 5.

Thus, according to a preferred embodiment of this invention, there is provided a method of producing a laminated sheet-like material which comprises interposing an adhesive layer composed of a powdery thermoplastic resin composition or an air-permeable sintered product thereof between at least two sheet-like materials, placing the resulting assembly in a pressure reduction chamber composed of an at least partly flexible and gas-tight sheet together with a buffering frame having a thickness larger than the total thickness of the assembly and provided around the assembly, evacuating the pressure reduction chamber at reduced pressure to deaerate the adhesive layer of the assembly, heating the assembly while it is maintained in the deaerated state at least in the initial stage of heating thereby to melt the powdery resin composition or its air-permeable sintered product and bond the sheet-like materials integrally with the adhesive layer.

Figure 6:
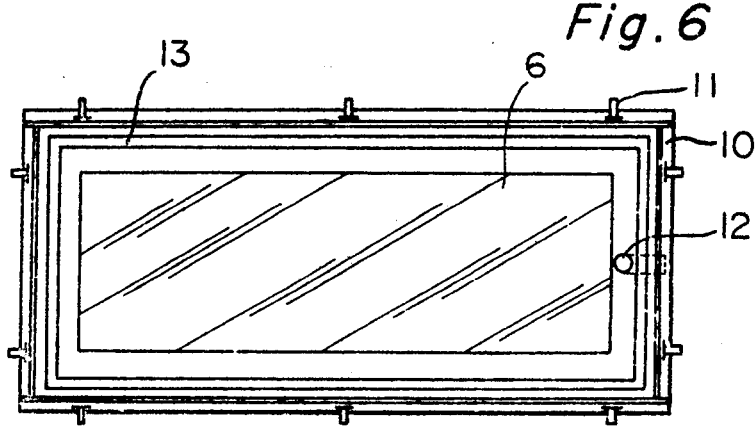
FIG. 6 is a schematic plan of the structure shown in FIG. 5.

The performance of this preferred embodiment will be understandable more specifically by referring to FIGS. 5 and 6. An assembly 6 produced by interposing an adhesive layer of a powdery thermoplastic resin composition or a sintered product thereof between glass sheets 1 and 1' is transferred onto a sheet-like rigid body 9. Around the assembly, a press buffering frame 13 is disposed, and the assembly is covered with a flexible gas-impermeable sheet 3. The edges of the sheet are held by a holding frame 10 and clamped with a clip 11 to form a pressure reduction chamber. An exhaust port 12 is provided in the rigid body 9 for evacuation at reduced pressure at a temperature below the softening point of the powdery thermoplastic resin, preferably at room temperature. As is shown in FIG. 5, the pressing force exerted on the edge portion of the assembly is reduced to a considerable degree by the support of the sheet 3 by the buffer frame 13. If after the completion of pressure reduction, the assembly is heated to a temperature at which the thermoplastic resin can be softened by using a suitable means such as by placing the entire pressure reduction chamber, the powdery resin which forms the adhesive layer is melt adhered and becomes transparent, since the assembly is pressed by atmospheric pressure. The laminating operation can be finished at this stage by stopping the heating operation. If the temperature and pressure elevation is continued further in this state, the resin becomes fluidized, and begins to exude at the edge portion of the assembly. In order to avoid this, a cock (not shown) provided at the exhaust port 8 is changed over to return the inside pressure of the pressure reduction chamber to atmospheric pressure, and the heating is continued in a load-free condition. Since the adhesive layer is melted and integrated, air no longer intrudes even when the pressure is returned to atmospheric pressure. In addition, since the resin has been heated to higher temperatures, the viscosity of the resin is reduced and the resin wets the glass sheets well. This results in an increase in bond strength, and the warping of the edge portions of the glass sheets caused by the treatment in vacuo at low temperatures can be corrected by the unique elasticity of the glass plate. This makes it possible to remove the distortion of an image at the edge portion of the product, and a glass laminate of higher quality can be obtained.

Thus, according to such a preferred embodiment of this invention, when the assembly is placed in a pressure reduction chamber and the adhesive layer is deaerated, the assembly undergoes pressing force by the action of atmospheric pressure through the flexible sheet wall, but the flexible sheet wall is supported by the buffering frame disposed along the edge of the assembly to reduce the pressing force on the edge of the assembly. For this reason, the troubles of the sheet-like material, for example, the breakage of the glass sheet, can be avoided completely at the time of deaeration. At the same time, the possibility of exuding of the resin at the time of heating can be reduced. The press buffering frame may be of any material and configuration if it has a thickness larger than the total thickness of the assembly and has rigidity that can withstand the pressing force caused by atmospheric pressure. Round rods or rectangular materials may simply be arranged on the four sides of the assembly to form the buffering frame. If these materials are assembled into an integral body, the assembled product lends itself to easy handling and does not cause any trouble during the process.

Furthermore, according to the method of this invention, there can be provided a laminated sheet containing a decorative material by interposing an adhesive layer of a powdery thermoplastic resin composition or a sintered product thereof between a plurality of sheet-like materials at least one of which is a transparent or semi-transparent sheet-like material, and inserting a decorative sheet in the adhesive layer in contact with the transparent or semi-transparent sheet-like material of the assembly or placing it on the surface of the adhesive sheet. This decorative material-incorporated laminated sheet is also included within the scope of the present invention.

Figure 7:
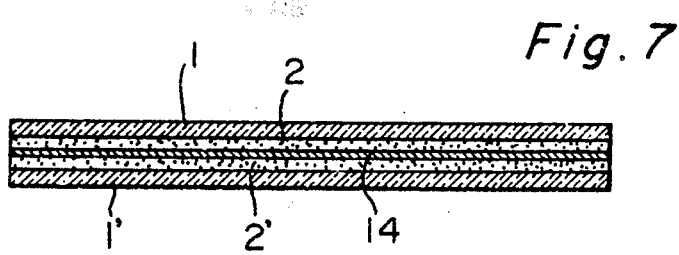
FIGS. 7 and 8 are sectional views of assemblies in which a decorative sheet has been inserted.
Figure 8:
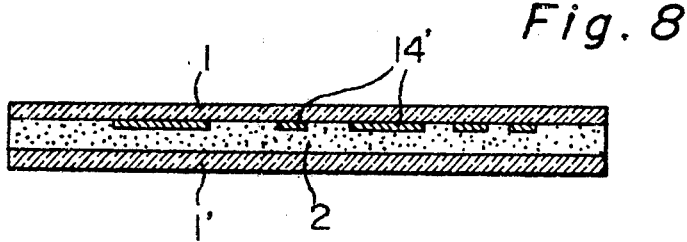

As is shown in FIG. 7, the decorative sheet 14 can be embedded between adhesive layers 2 and 2', or as shown in FIG. 8, the decorative sheet 14' can be placed on the surface of the adhesive layer 2, that is at the boundary surface between the sheet-like material 1 or 1' and the adhesive layer 2. In the latter-mentioned embodiment, the decorative sheet 14' should not completely cover the entire surface of the adhesive layer, but should partly cover it. Alternatively, it should be in the form of wire, net or lace which even when covering the entire surface, contacts it only partly and adheres thereto.

The main purpose of incorporating the decorative sheet 14 and 14' in the adhesive layers 2 and 2' of the assembly is to enhance the decorative effects of the laminate. Accordingly, at least one of the sheet-like materials in contact with the adhesive layer containing the decorative sheet-like material should be transparent or semi-transparent such as in a glass sheet or synthetic resin sheet.

Preferably, the decorative sheet used for the production of the decorative laminate should not melt in the heating step as described above. It can be selected, for example, from metal foils, synthetic resin films, knitted or woven fabrics, non-woven fabrics, paper and wires. These decorative sheets can be freely selected irrespective of their surface conditions, shapes, etc. Thus, the surface of the decorative sheet may be imprinted or plated, or cut into various shapes. Or such a sheet can be incorporated in at least one of the adhesive layers of the assembly for the purpose of reinforcing the laminate concurrently with decorative purposes. In such a case, the sheet-like material need not be transparent.

These laminates containing decorative sheets can be produced in the same way as described above except that the decorative sheet is incorporated with the adhesive layers of the assembly.

Since powdery thermoplastic resins are used in the method of the present invention, the operation of spraying the powders onto the surface of sheet-like materials can be readily mechanized and automated using the known methods and apparatus. This can eliminate the complicated manual operation required in the conventional techniques using a film-like or liquid resin adhesive. Also, the thickness of the adhesive layer can be controlled as desired, and the powders fed in excess can be recovered. There is hardly any loss of the resin used irrespective of the shape and dimension of the laminated sheet-like material. Furthermore, since an air flow path is ensured over the entire area of the adhesive layer, a uniform degree of vacuum can be readily obtained over the entire area of the adhesive layer irrespective of the presence of the decorative sheet or the number of sheet-like materials to be laminated, only by exhausting air from any desired point on the edge portion of the assembly after sealing it with a vacuum bag or pressure reduction chamber. Thus, de-aeration is performed completely, and atmospheric pressure acting on the laminated assembly is distributed uniformly. Accordingly, by heating the assembly to the temperature at which the thermoplastic resin used can be softened and bonded, complete bonding can be achieved within very short periods of time and without the need for heating under pressure in an autoclave as in the conventional techiques. In addition, since the assembly has a small heat capacity, heating and cooling can be readily carried out. The resulting advantages ascribable to the automation, the reduced loss of the adhesive material and the shortening of the operating time are great, and the cost of production can be extremely reduced. Furthermore, since the adhesive resin is in the powdery form or an air-permeable sintered product thereof, and undergoes heating in vacuo, the air present in the adhesive layer can be completely exhausted without being confined therein, and at the same time, easily volatile substances remaining in the resin can be thoroughly removed. Thus, when the product is exposed to high temperature during use, there is hardly any likelihood of causing bubbles.

Still further, since according to the method of this invention, the adhesive layer is a powder or an air-permeable sintered product before heating, air flow path is ensured over the entire area of the adhesive layer, and the pressure is exerted on the entire area uniformly. Accordingly, it is not necessary to employ a complicated means as in the conventional production of glass laminates which requires the provision of an air-permeable layer between a sheet of a vacuum bag and a glass sheet in order to distribute the pressure uniformly.

According to the method of this invention, the thickness of the adhesive layer between the sheet-like materials can be freely adjusted over a wide range, some below 1 mm, and some above 1 mm, and there can be provided laminated sheets for use in various structural materials. In the most preferred embodiment of this invention, safety glass laminates for traffic conveniences such as automobiles or airplanes or windowpanes of buildings are provided.

The following Examples will further illustrate the present invention.

EXAMPLE 1

In this Example, a glass laminate was produced using a vacuum bag of the type shown in FIG. 1.

Two glass sheets each having a size of 91.4 cm × 61 cm × 3 mm (thickness) were prepared. 220 g of a butyral resin powder having an average particle size of not more than 100 mesh was sprayed on the surface of one glass sheet 1' to form a powder layer having a thickness of about 1.2 mm. Then, the other glass sheet 1 was superposed thereon to form an assembly. The assembly was held by two 40 micron thick polyvinyl alcohol films 3 and 3'. An exhaust port 3 was provided, and then the edges of the films were held by holding frames 5 and 5' to form a vacuum bag. At room temperature, the air was exhausted by means of a vacuum pump from the exhaust port 4. When the inside of the vacuum pump became vacuum, the assembly together with the vacuum bag was placed in a hot air oven held at 150°C., heated for 15 minutes, withdrawn, and then allowed to cool. When the temperature of the glass sheets fell down to about 100°C., the operation of the vacuum pump was stopped, and the assembly was withdrawn by opening the vacuum bag. There was obtained a glass laminate with an adhesive layer having a thickness of about 0.4 mm which was transparent and free from residual bubbles.

A 30 cm-sided square test piece cut out from the resulting glass laminate proved satisfactory in a boiling test conducted in accordance with JIS R-320.

EXAMPLE 2

In this Example, a glass laminate was produced using a rubber gasket shown in FIGS. 2 and 3. Two glass sheets each having a size of 91.4 cm × 61 cm × 2 mm (thickness). 260 g of a powdery ethylene/vinyl acetate copolymer having a particle size of not more than 28 mesh was uniformly sprayed on the surface of one glass sheet 1' to form a powder layer having a thickness of about 1.5 mm. Then, the entire surface of the powder layer was heated for 2 to 3 minutes by an infrared ray lamp to sinter the surface. Then, the other glass sheet 1 was placed thereon to form a laminated assembly. A rubber gasket 7 having a C-shaped cross section and an exhaust port 8 was mounted on the edges of the resulting assembly 6, and at room temperature, the air was exhausted from the exhaust port 8 by means of a vacuum pump to maintain the sintered layer vacuum. Then, the assembly was placed in a hot air oven held at 100°C., heated for 10 minutes, withdrawn, and cooled. When the temperature of the glass sheets fell down to about 80°C., the operation of the vacuum pump was stopped, and the gasket was dismounted. The resulting glass laminate had an adhesive layer having a thickness of about 0.5 mm which was rendered completely transparent with no residual bubbles.

A 30 cm-sided square test piece cut out from the resulting glass laminate proved satisfactory in a boiling test conducted in accordance with JIS R-320.

EXAMPLE 3

250 g of the same resin powder as used in Example 2 was sprayed uniformly on the surface of a glass sheet having a size of 91.4 cm × 61 cm × 2 mm (thickness), and then the glass sheet was placed in a drying oven held at about 100°C., heated for 6 minutes, and then withdrawn. As a result, the resin powder became a porous sintered layer over the entire adhesive layer, and even when the glass sheet was turned upside down, the resin layer did not fall off but partly meltadhered to the surface of the glass sheet.

The bonding operation was performed subsequently in the same manner as set forth in Example 2. The resulting glass laminate had an adhesive layer having a thickness of about 0.5 mm which was rendered completely transparent and free from residual bubbles.

EXAMPLE 4

In this Example, the bonding of glass sheets was performed using a pressure reduction chamber of the type shown in FIGS. 4 and 5. Two glass sheets each having a size of 91.4 cm × 61.0 cm × 2 mm (thickness) were prepared. 280 g of a powdery ethylene/vinyl acetate copolymer having an average particle size of not more than 30 mesh was uniformly sprayed on the surface of one glass sheet 1' to form a resin layer 2. Then, the other glass sheet 1' was superposed thereon to form a laminated assembly. A 10 mm thick commercially available plywood was processed to provide an exhaust port 12. Except the exhaust hole 12, the plywood was covered with a 0.3 mm thick commercially available tin plate to make it non-air-permeable thereby to build a sheet-like rigid body 9. The resulting assembly was placed on the sheet-like rigid body 9, and a press buffering frame 13 having an inside dimention of 92.4 cm × 62.0 cm and made of a square timber with each side of the square being 10 mm was provided around the assembly. All of the above materials were held by a 40 micron thick polyvinyl alcohol film 3, and in order to maintain air-tightness, the film 3 and the rigid body 9 were clamped by means of an angle frame 10 (L 30 × 30 × 3) and a clip 11 to form a pressure reduction chamber. At room temperature, the air inside the chamber was exhausted by a vacuum pump from the exhaust port 12. The pressure was reduced to −700 mmHg gauge. Then, the entire pressure reduction chamber containing the assembly was placed in a hot air oven held at 110°C. When the temperature of the assembly reached 85°C., a cock connected to the exhaust port 12 provided in the pressure reduction chamber was changed over to return the inside of the chamber to atmospheric pressure. In this state, the temperature of the assembly was allowed to reach 110°C., and the assembly was maintained at 110°C. for 5 minutes. Immediately thereafter, the pressure reduction chamber was withdrawn from the hot air oven, and when the temperature reached about 80°C., the pressure reduction chamber was opened, and the assembly was withdrawn. The thickness of the adhesive layer of the resulting glass laminate was about 0.5 mm. It was rendered completely transparent, and there was no residual bubble. At the edge portion, too, no distortion occured in the image seen through the laminate. A 30 cm-sided square test piece proved satisfactory in a boiling test (JIS R-3205).

EXAMPLE 5

300 g of a powdery ethylene/vinyl acetate copolymer having a particle size of not more than 28 mesh was uniformly sprayed on a glass sheet having a size of 950 mm × 650 mm × 2 mm (thickness). Two quartz heaters (each having a capacity of 2.5 KW) were caused to reciprocate over the surface of the adhesive layer at a position 15 cm above it at a speed of 2 meters per minute. The surface of the powdery resin layer was sintered to form a sintered sheet, but since the back surface was in contact with the glass, the heating was not sufficient. Thus, the sheet was turned upside down and again heated in the same way to form a completely sintered sheet. Using the resulting sintered glass, a glass laminate was produced in quite the same way as set forth in Example 4. There was no difference in advantage from the case of producing it using a powdery resin.

An assembly produced in the same way as in Examples 4 and 5 was placed in a pressure-reduction chamber not using a buffering frame as shown in FIG. 4, and heated at reduced pressure to 110°C. The resulting glass laminate caused some distortion in the image seen therethrough at the edge portion over a width of about 50 mm. A sample cut out from the glass laminate including the above edge portion was subjected to a boiling test (JIS R-3205). It was found that the bubbles were formed on those portions which corresponded to the edge portion.

EXAMPLE 6

Two glass sheets having a size of 1,930 mm × 864 mm × 3 mm (thickness) and a 1.8 mm thick air-permeable sintered sheet (cut in a dimension of 1930 mm × 864 mm) prepared by sintering a powder of a partially saponified product (saponification degree 50 %) of an ethylene/vinyl acetate copolymer spread at a rate of 500 g per square meter were prepared. The sintered sheet was interposed between the glass sheets to form an assembly, and the assembly was placed in a vacuum bag of the construction shown in FIG. 5. The air inside the vacuum bag was exhausted from an exhaust port by means of a vacuum pump. When the pressure inside the vacuum bag reached not more than −700 mmHg gauge the vacuum bag containing the assembly was placed in a hot air oven held at 150°C. When the temperature of the glass sheets reached 100°C., the vacuum bag was withdrawn, and a valve at the exhaust port was changed over to return the pressure to atmospheric pressure. When the pressure inside the vacuum bag returned to atmospheric pressure, the vacuum bag was opened, and the assembly was withdrawn. There was obtained a glass laminate having an adhesive layer having a thickness of about 0.5 mm which was transparent and free from residual bubbles. This glass laminate proved satisfactory in an impact test in accordance with ANSI Z 97.1-1972 and a boiling test (JIS R 3205).

EXAMPLE 7

Two glass sheets each having a size of 1,830 mm × 915 mm × 3 mm (thickness), two 0.7 mm thick air-permeable sintered sheets (size 1,830 mm × 915 mm) prepared by sintering nylon-12 powders spread at a rate of 200 g per square meter, and a saturated polyester film on which aluminum was vacuum deposited were superposed as shown in FIG. 7. They were bonded by the same method as shown in Example 6 except that the glass sheets were heated up to 145°C. In the resulting laminate glass, the adhesive layer (thickness 0.4 mm) was rendered completely transparent, and no residual bubble was observed. The resulting glass laminate was found suitable as a windowpane material having a thermic ray reflecting ability.

EXAMPLE 8

A 5 mm thick glass sheet having a size of 1,820 mm × 910 mm, a 4 mm thick asbestos cement plate having the same size, two 0.7 mm thick air-permeable sintered sheets (1820 mm × 910 mm) prepared by sintering a powdery ethylene/vinyl acetate copolymer spread at a rate of 200 g per square meter, and one sheet of paper imprinted with a stone-like pattern and having a size of 1,820 mm × 910 mm were superposed as shown in FIG. 7, with the printed surface of the paper facing the glass sheet. Subsequently, in the same way as in Example 7, they were laminated to form a laminate sheet. They were found to be completely bonded, and the stone-like pattern could be seen through the glass surface. The laminate was beautiful and tough and found suitable as an exterior and interior decorating material for use in construction.

EXAMPLE 9

In this Example, a glass laminate including a decorative material was produced using a vacuum bag of the type shown in FIG. 1.

Two glass sheets having a size of 1,930 mm × 864 mm × 3 mm (thickness) were prepared. A powdery ethylene/vinyl acetate copolymer having an average particle diameter of not more than 30 mesh was sprayed uniformly on the surfaces of the glass sheets 1 and 1' to form an adhesive layer having a thickness of 1.8 mm, and then the glass sheets were heated for 5 minutes in a hot air oven held at 110°C. Then, a 40 micron thick ethylene/vinyl acetate copolymer film which had been imprinted with markings and letters were interposed between the glass sheets 1 and 1' through the sintered powder layers 2 and 2' to form an assembly as shown in FIG. 7. The resulting assembly was covered with 75 micron thick polyvinyl alcohol films 3 and 3', as shown in FIG. 1. An exhaust port 4 was provided and the edge portion was held air-tightly with holding frames 5 and 5' to make a vacuum bag. At room temperature, the air inside was exhausted by means of a vacuum pump through the exhaust port 4. When the pressure inside the vacuum bag became not more than −700 mmHg, the vacuum bag containing the assembly was placed in a hot oven held at 150°C., heated for 10 minutes, and then withdrawn. The operation of the vacuum pump was stopped, and the assembly was withdrawn by opening the vacuum bag. There was obtained a glass laminate with an adhesive layer having a thickness of about 0.5 mm which was transparent except the printed portions of the printed markings and letters, and contained no residual bubbles. This glass laminated proved satisfactory in an impact test in accordance with ANSI Z 91-1972 (U.S. safety glass standards for architecture) and a boiling test (JIS R-3205).

EXAMPLE 10

The laminating operation was performed in the same way as in Example 9 using an assembly containing a continuous fiber mat produced from glass fiber rovings instead of the ethylene/vinyl acetate copolymer film. The resulting glass laminate resembled Japanese paper had proper light-transmitting property and did not permit a perspective view therethrough. It also possessed sufficient safety, and exhibited very suitable properties as a partitioning material having lighting ability.

EXAMPLE 11

In this example, a glass laminate containing a decorative material was produced using a rubber gasket of the type shown in FIGS. 2 and 3. Two glass sheets each having a size of 800 mm × 780 mm × 2 mm (thickness) were prepared, and sintered powder layers 2 and 2' were found on the surfaces of the glass sheets 1 and 1' in the same way as in Example 9. Then, marks or letters 14' formed by punching a colored aluminum plate with a thickness of 0.1 mm were interposed between the glass sheets 1 and 1' through the sintered powder layers 2 and 2' while aligning them at the desired positions. A gasket 8 made of a thermally stable rubber having a C-shaped cross section and an exhaust port 8 was mounted on the edge of the assembly. At room temperature, the air inside was exhausted from the exhaust port using a vacuum pump. This rendered the sintered powder layer vacuum. Then, the assembly was placed in a hot oven held at 130°C., heated for 10 minutes, and then withdrawn. The vacuum circuit was released, and the gasket 7 was removed. The resulting glass laminate had an adhesive layer with a thickness of about 0.5 mm and was completely rendered transparent. The inserted marks and letters could be clearly seen through. In an impact test, the laminate proved to have sufficient safety.

What we claim is:

1. A method of producing a laminated sheet-like material, which comprises interposing an adhesive layer composed of a preformed air-permeable sintered sheet of a powdery thermoplastic resin composition between at least two sheet-like materials to form an assembly, maintaining the assembly under reduced pressure to deaerate the adhesive layer and to press the assembly by the difference of pressure between the reduced pressure and atmospheric pressure, and heating the assembly at a temperature higher than the softening point of the thermoplastic resin, while maintaining the reduced pressure during at least the initial stage of heating thereby to melt the sintered sheet and bond the sheet-like materials to provide an integral body.

2. The method of claim 1 wherein said sheet-like material is selected from the group consisting of glass sheets, asbestos cement plates, plaster board and synthetic resin sheets.

3. The method of claim 1 wherein said adhesive thermoplastic resin is selected from the group consisting of an ethylene/vinyl acetate copolymer, polyvinyl acetate, a polyvinyl butyral resin, a butyl methacrylic resin, polyamide resins, and polyisobutylene.

4. The method of claim 1 wherein said preformed air-permeable sheet is made by sintering a powdery thermoplastic resin composition having an average particle diameter of not more than 14 mesh.

5. The method of claim 1 wherein said preformed air-permeable sintered sheet has a bulk density of 0.2 to 0.4.

6. The method of claim 1 wherein said assembly is maintained under reduced pressure of not more than −650 mmHg gauge.

7. The method of claim 1 wherein said assembly is placed in a vacuum bag or pressure reduction chamber composed of at least a partly flexible gas-tight sheet, and the vacuum bag or pressure reduction chamber is evacuated and maintained under reduced pressure thereby to perform deaeration.

8. The method of claim 1 wherein said initial heating is performed at a temperature 10° to 50°C higher than the softening point of the adhesive thermoplastic resin used.

9. The method of claim 8 wherein said heating of the assembly is carried out in two stages:
   a. heating said assembly under the deaerated state until the thermoplastic resin composition is softened, and
   b. releasing the reduced pressure and then further heating the assembly at a temperature which is 0 to 30°C higher than the temperature of heating in the stage ($a$).

10. The method of claim 1 wherein during the heating under the deaerated state, the assembly is pressed with a pressure of 0.8 kg/cm$^2$ to 1.0 kg/cm$^2$.

11. The method of claim 1 wherein said assembly is placed in a pressure reduction chamber made of an at least partly flexible and gas-tight sheet and a pressure buffering frame having a thickness larger than the thickness of the assembly and encircling the assembly, the pressure reduction chamber is evacuated to deaerate the adhesive layer and to press the assembly by the difference of pressure between the reduced pressure and atmospheric pressure, and said assembly is heated at a temperature higher than the softening point of the thermoplastic resin, while maintaining the deaerated state during at least the initial stage of heating thereby to melt the preformed air-permeable sintered sheet and bond the sheet-like material to provide an integral body.

12. A method of producing a laminated sheet-like material including a decorative material, which comprises interposing an adhesive layer composed of a preformed air-permeable sintered sheet of a powdery thermoplastic resin composition between a plurality of sheet-like materials at least one of which is a transparent of semi-transparent sheet-like material, thereby to form an assembly, incorporating a decorative sheet in the adhesive layer in contact with the transparent or semi-transparent sheet-like material or placing it on the surface of the adhesive layer, maintaining the assembly under reduced pressure to deaerate said adhesive layer and to press the assembly by the difference of pressure between the reduced pressure and atmospheric pressure, and heating the assembly at a temperature higher than the softening point of the thermoplastic resin, while maintaining this reduced pressure during at least the initial stage of heating thereby to melt the thermoplastic resin composition powder of the preformed air-permeable sintered sheet and bond the sheet-like materials to provide an integral body.

13. The method of claim 12 wherein said decorative sheet is selected from the group consisting of metal foils, synthetic resin films, knitted and woven fabrics, non-woven fabrics, paper and wire.

* * * * *